United States Patent [19]

Mogren et al.

[11] 3,848,812

[45] Nov. 19, 1974

[54] PROCESS FOR EXTRACTING PROTEIN FROM MICROORGANISMS

[75] Inventors: Hakan Lars Mogren, Solna; Gudmund Oscar Hedenskog, Stockholm; Lennart Eugen Enebo, Ektorp, all of Sweden

[73] Assignee: SCP-Exploatering AB, Solna, Sweden

[22] Filed: Feb. 26, 1973

[21] Appl. No.: 336,148

[52] U.S. Cl. .......................... 241/2, 241/17, 241/24
[51] Int. Cl. .............................................. B02c 19/12
[58] Field of Search .................. 241/1, 2, 14, 17, 24

[56] References Cited
UNITED STATES PATENTS

| | | | |
|---|---|---|---|
| 3,556,414 | 1/1971 | Eberly | 241/2 |
| 3,679,139 | 7/1972 | Schneyour et al. | 241/2 |

*Primary Examiner*—Granville Y. Custer, Jr.
*Attorney, Agent, or Firm*—Toren, McGeady and Stanger

[57] ABSTRACT

The invention relates to a process for extracting protein from micro-organisms in order to obtain protein concentrates having reduced contents of nucleic acids. This is accomplished by producing a suspension of the micro-organisms, exposing said suspension to a cell wall disintegration treatment, adjusting the pH of the suspension to a value higher than 6, increasing the temperature of the suspension to more than 30°C to precipitate the protein, and separating the precipitated protein from the liquid.

13 Claims, No Drawings

PROCESS FOR EXTRACTING PROTEIN FROM MICROORGANISMS

This invention relates to a process for extracting protein from microorganisms. More specifically the invention relates to an improved process by which there are obtained protein concentrates having low contents of nucleic acids.

It has been shown that the ability for humans to utilize the protein in microbial cell mass is very limited if the cell mass is used as a protein additive in foods without any preceding treatment. This fact is supposed to be due to the cell walls, which prevent a good contact between the cell content and the digestive system. A first measure when microbial protein shall be used must therefore be a disruption of the cell walls to make the protein more available. Said disruption can be achieved by chemical means, enzymatically, by heat treatment or mechanically, for instance by milling.

Even if such a disruption of the cell walls is performed difficulties will arise. Thus, together with the protein there are nucleic acids or degradation products of nucleic acids. A high content of nucleic acids, mainly ribonucleic acid (RNA), makes the cell mass unsuitable for consumption as negative side effects will occur.

In order to make the microbial protein utilizable for human consumption, it is therefore important to prepare protein concentrates having reduced contents of nucleic acids, from the starting microbial cell mass. No technical method is previously known for the preparation of protein concentrates having low contents of nucleic acids.

It has now unexpectedly been found that it is possible to prepare a microbial protein concentrate with a low content of nucleic acid by means of a cell wall degradation followed by a heat treatment with or without the addition of a salt, of the disintegrated cell mass. Said heat treatment is performed in such a manner that the main part of the protein but not of the nucleic acids will be precipitated.

Based on this discovery the present invention relates to a process for extracting protein from microorganisms, comprising producing a suspension, preferably an aqueous suspension, of the microorganisms, exposing said suspension to a cell wall disintegration treatment, adjusting the pH of the suspension to a value higher than 6, increasing the temperature of the suspension to more than 30°C to precipitate the protein, and separating the precipitated protein from the liquid.

By the process according to the invention it has been possible to obtain protein concentrates having very low contents of nucleic acids, such as below 2 percent.

To release the cell content a cell wall degradation must be performed as mentioned above. The degradation must be performed in such a way that the cell protein is not destructed so that its food value is impaired. Said degradation is preferably performed mechanically or mechanically-physically. Especially suitable is a treatment of the suspension of protein-containing microorganisms in a homogenizer equipped with milling particles. The particles should consist of a material, for instance of certain glass or steel material, which is acceptable in food processing. For yeast, microalgae and bacteria spherical particles with a diameter less than 2 mm can be used according to a previously known method. For continuous operation optimal disintegration conditions can easily be arrived at. The milling particles can be continuously separated, e.g. in a sieve.

The pH-value of the disintegrated cell material is adjusted to a value higher than 6, preferably 6–12. 12. This means that the main parts of the nucleic acids are dissolved. At the following precipitation of the protein concentrate the nucleic acids will be obtained in the liquid.

In the cases when there is a reason to suspect the presence of cell wall bound substances unsuitable as food ingredients the cell walls can be removed by separation before the protein precipitation. In this case it is suitable to make the said pH adjustment in such a way that also the main part of the protein is dissolved. In this way losses of protein are avoided when removing cell walls and other insoluble material by centrifugation. When precipitating the protein concentrate the yield of protein and the content of RNA in the protein concentrate depend on the pH during the heat precipitation. A higher pH results in a lower yield of protein but gives a higher reduction of the RNA content.

The precipitation of the protein concentrate is accomplished by raising the temperature to above 30°C. Preferably the temperature is raised to a value within the range of 50°–110°C, more preferably 60°–100°C. The precipitation may be performed with or without the presence of a salt, e.g. sodium chloride or disodium hydrogen phosphate, in a concentration up to 20 percent, preferably up to 12 percent.

The separation of the precipitated protein concentrate can be performed by means of filtration, sedimentation or centrifugal separation. In this step the protein concentrate is separated from the supernatant containing the main part of the nucleic acids originating from the starting material. The protein concentrate contains more than 40 percent of the starting amount of protein.

The following examples further illustrate the present invention.

EXAMPLE 1

.10 kg of bakers' yeast (dry substance) containing 7 percent of RNA and 8 percent of nitrogen, corresponding to 50 percent of raw protein, are suspended in water to a volume of 100 liters at room temperature. The cells are disintegrated in a ball mill containing glass beads with a diameter of 0.50–0.75 mm. The pH is then adjusted to 9 and sodium chloride is added to a concentration of 5 percent. The suspension is heated to 70°C for the precipitation of protein. After said heat treatment the suspension is diluted with water to 500 liters and is then separated in a centrifugal separator. In the heavy phase containing 6 kg of dry substance the protein concentrate is obtained with a content of 1.5 percent of RNA and 9 percent of nitrogen, corresponding to 56 percent of raw protein.

EXAMPLE 2

.10 kg of bakers' yeast (dry substance) containing 7 percent of RNA and 8 percent of nitrogen, corresponding to 50 percent of raw protein, are suspended in water to a volume of 100 l at room temperature. The cells are disintegrated in a ball mill containing glass beads with a diameter of 0.50–0.75 mm. The pH is then adjusted to 11.5, the suspension then being separated in a centrifugal separator. The heavy phase contains mainly cell walls and other insoluble material. The light phase contains 7.6 kg of dry substance. The light phase is heated to 90°C for the precipitation of protein. After said heat treatment the light phase is diluted with water to 500 liters and is then separated in a centrifugal separator. In the heavy phase containing 3 kg of dry substance the protein concentrate is obtained with a content of 0.5 percent RNA and 85 percent of nitrogen, corresponding to 53 percent of raw protein.

If the pH before the heat treatment is decreased to 8.5, after the heat treatment at 90°C and after separation, 5 kg of protein concentrate containing 1 percent of RNA and 10 percent of nitrogen, corresponding to 63 percent of raw protein, are obtained.

EXAMPLE 3

10 kg of a Candida-cell mass (dry substance) containing 10 percent of RNA and 9 percent of nitrogen, corresponding to 56 percent of raw protein, are suspended in water to a volume of 100 liters at a temperature of 5°C. The cells are disintegrated in a ball mill containing sand of the Ottawa type. The pH is then adjusted to a value of 6.5 and disodium hydrogen phosphate is added up to an amount of 1 percent. The mixture is heated to 100°C for the precipitation of protein. After said heat treatment the dilution is accomplished with water up to 500 liters, the suspension then being filtered. In the filter cake 6.5 kg of dry substance comprising the protein concentrate and containing 1.5 percent of RNA and 10 percent of nitrogen, corresponding to 63 percent of raw protein, are obtained.

EXAMPLE 4

5 kg of a cell mass (dry substance) from a methanol oxidizing bacterium having an amount of RNA of 6 percent and nitrogen of 9.5 percent, corresponding to 60 percent of raw protein, are suspended in water to a volume of 100 liters at room temperature. The cells are disintegrated in a pressure homogenizer (of the type Manton-Gualin. The pH is then adjusted to a value of 12 and the suspension is separated in a centrifugal separator. The heavy phase contains essentially cell walls. The light phase contains 3.7 kg of dry substance. The pH value is then adjusted to 7.5 and sodium chloride is added up to 10 percent. The light phase is heated to 80°C for the precipitation of protein. After said heat treatment dilution is performed with water up to 700 liters, the suspension then being separated in a centrifugal separator. In said heavy phase 2.3 kg of dry substance are obtained which comprises the protein concentrate containing 1 percent of RNA and 11 percent of nitrogen, corresponding to 69 percent of raw protein.

EXAMPLE 5

5 kg of a cell mass (dry substance) from the micro alga Spirulina containing 4 percent of RNA and 9 percent nitrogen, corresponding to 56 percent of raw protein, are suspended in water up to 100 liters at 30°C. The cells are disintegrated in a ball mill containing glass beads having a diameter of 0.1–2.0 mm. The pH is then adjusted to a value of 8.5 and sodium chloride is added up to 1 percent. The suspension is heated up to 60°C for the precipitation of the protein. After said heat treatment dilution is accomplished with water up to 500 liters and the suspension is then separated in a centrifugal separator. In the heavy phase 2.8 kg of dry substance are obtained which comprises the protein concentrate containing 0.4 percent of RNA and 10.5 percent nitrogen, corresponding to 65 percent of raw protein.

What is claimed is:

1. A process for extracting protein from microorganisms, to obtain a protein concentrate having a low nucleic acid content comprising producing a suspension of the microorganisms, exposing said suspension to a cell wall disintegration treatment, adjusting the pH of the suspension to a value higher than 6, increasing the temperature of the suspension to more than 30°C to precipitate the protein, and separating the precipitated protein from the liquid.

2. The process as claimed in claim 1, wherein the disintegration of the cell walls is performed by mechanical cell disintegration in a homogenizer equipped with milling particles.

3. The process as claimed in claim 1, wherein the disintegration of the cell walls is performed in a pressure homogenizer.

4. The process of claim 1 wherein the pH is adjusted to a value in the range of 6–12.

5. The process of claim 1 wherein the pH adjustment is followed by a removal of cell walls and other insoluble material by separation before the precipitation of the protein concentrate.

6. The process as claimed in claim 5, wherein the heat precipitation is performed at a lower pH than at the separation so that losses of protein, when removing cell walls and other insoluble material by separation, are reduced.

7. The process of claim 1 wherein the temperature is increased to between 50–110°C.

8. The process of claim 7 wherein said precipitation of protein concentrate is performed in the presence of a salt in an amount of no more than 20 percent.

9. The process of claim 1, wherein said separation is performed by means of centrifugal separation.

10. The process as claimed in claim 7 wherein the temperature is increased to 60–100°C.

11. The process as claimed in claim 8, wherein the salt used is sodium chloride.

12. The process as claimed in claim 8, wherein the amount of salt is no more than 12 percent.

13. The protein concentrate obtained by the process of claim 1.

* * * * *